Dick E. Stearns
Robert H. Lee
INVENTORS.

United States Patent Office 3,435,320
Patented Mar. 25, 1969

3,435,320
DC TO DC CONVERTER
Robert H. Lee, 2820 Terraza Place, Fullerton, Calif.
92632, and Dick E. Stearns, 3103 Iberville, Shreveport, La. 71109
Filed Feb. 10, 1967, Ser. No. 615,268
Int. Cl. H02m 3/32
U.S. Cl. 321—2                                    3 Claims

ABSTRACT OF THE DISCLOSURE

DC to DC converter system, in which by a positive feedback connection to an electronic switch, energy is alternately charged into a magnetic field, and after abrupt turn off of said electronic switch, magnetic energy is converted to current and passed through a diode and utilized to charge a capacitor, the alternate energy charging and discharging actions being sustained in their sequence by said positive feedback operation on the gate of said electronic switch. The turn-off action of the electronic switch is initiated by the potential drop across a resistor proportional to input current to the converter.

---

There are numerous applications for efficient DC to DC power converters and particularly for converters which will provide regulated output voltage.

An important and difficult to solve problem is one in which the load consists of a capacitor which is periodically discharged and must be recharged efficiently to some predetermined voltage level, while operating from a source of DC power which may vary widely in voltage. Such applications would include ignition systems of the capacitor discharge type, photo-flash equipment in which an energy storing capacitor is discharged through a gaseous discharge lamp, laser pumping, utilizing capacitor discharge through a gas or a wire, etc.

The power supply of this invention operates efficiently over wide extremes of input voltage, making this DC to DC converter highly suitable for use with radiant energy voltage sources as are commonly employed in deep space probes. In such applications this converter may be operated over as much as 10:1 range of input voltage, while providing a regulated output voltage, and will perform such a function at a high level of efficiency.

Figure 1:
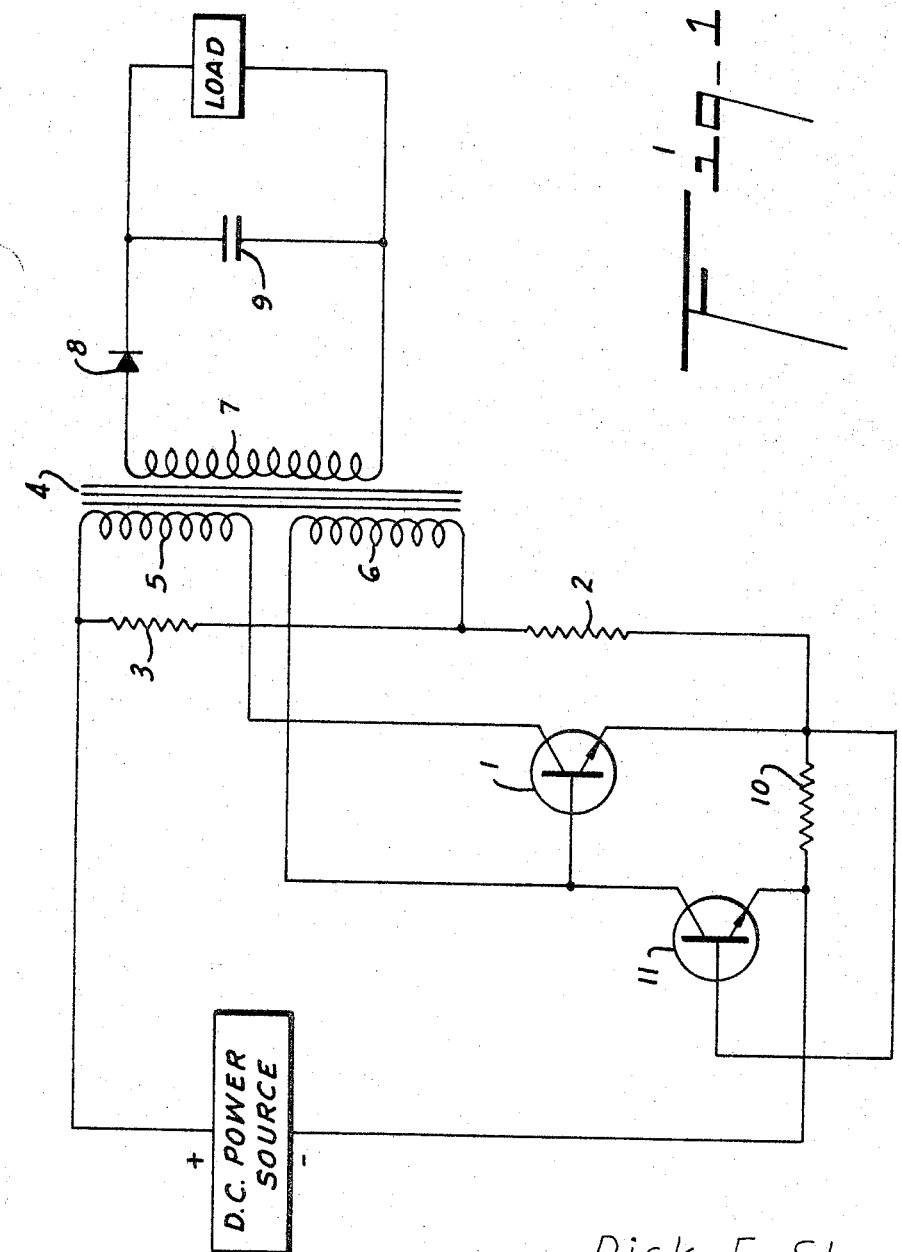
FIG. 1 is a schematic diagram of a circuit illustrative of a concept of the invention having a positive electronic switch cutoff when the power input rate reaches a predetermined maximum.

Reference will now be had to the drawing in more detail.

In FIG. 1 DC input power connects from the source, which might be a battery, a group of fuel cells, or the like, and through primary power winding 5 of the transformer 4 and through transistor 1, and back to the opposite side of the DC power source. Transistor 1 closes connection of this power circuit by current flow from the power source, through transformer drive winding 6 to the base of transistor 1, which renders transistor 1 conductive. Transformer 4 is provided with an air gap in the core structure or equivalent, whereby magnetic energy, derived from current in the winding 5, may be stored. Current rises from time of transistor 1 closure in a relatively linear manner.

Except for the presence of resistor 10 and transistor 11, current from the positive side of the input power source is connected through resistor 3 and resistor 2 to the negative line from the power source. Resistor 3 provides start-up signal current from the DC source through winding 6 to the base of transistor 1. Resistor 2 functions to limit base current of transistor 1. The junction of resistors 2 and 3 is arranged to be sufficiently positive to pass a small starting current through winding 6 and through the base-emitter junction of transistor 1, and as transistor 1 goes into conduction the positive feedback arrangement between input power winding 5 and driving winding 6, causes the transistor to become fully turned on. Thus winding 5 is effectively connected across the power source terminals through the transistor 1 emitter-collector junction. The base of transistor 1 receives turn on current, the magnitude of which is determined by the potential of winding 6 and the value of drive current limiting resistor 2.

Energy is now stored in the magnetic field of the transformer 4. When current through winding 5 and transistor 1 attains a value such that the base current is no longer adequate to sustain saturation of transistor 1, voltage across winding 5 is consequently reduced, and by positive feedback action on winding 6 current is reduced and the transistor is switched fully off in a short time interval. Voltage is by this time reversed on all windings and current now flows through secondary winding 7 and diode 8 into capacitor 9. When all energy stored in the magnetic field of transformer 4 is delivered into the capacitor 9 and/or load, voltage across the transformer winding collapses and the cycle starts again.

The potential across all windings during delivery of energy into the capacitor 9 is established by the potential across the capacitor 9.

The time duration of all energy delivery half cycles is determined also by the capacitor 9 voltage and the volt-second product of such energy delivery half cycles stays relatively constant.

Figure 3:
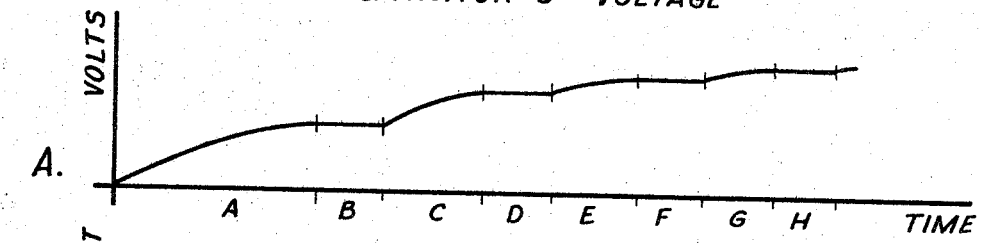
FIG. 3 is a series of five curves of graphic illustrations of the relationship between the various voltages and currents during several operational cycles of the converter shown in FIG. 1.
Figure 3:
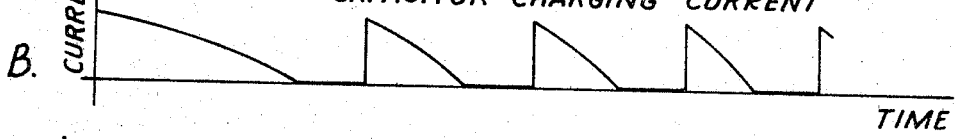
Figure 3:
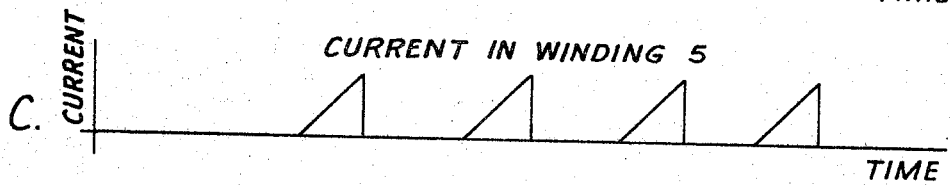
Figure 3:
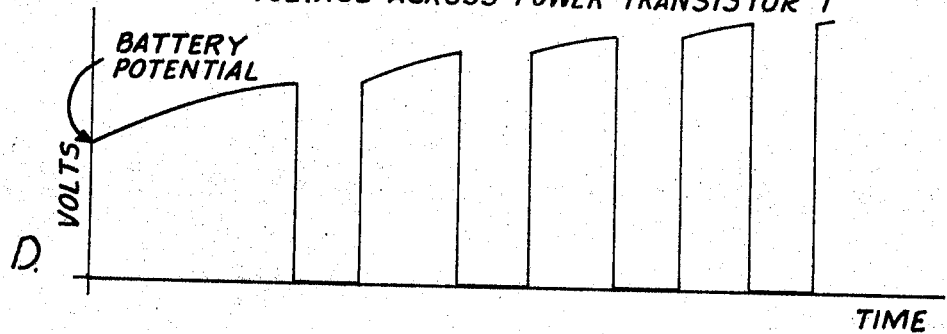
Figure 3:
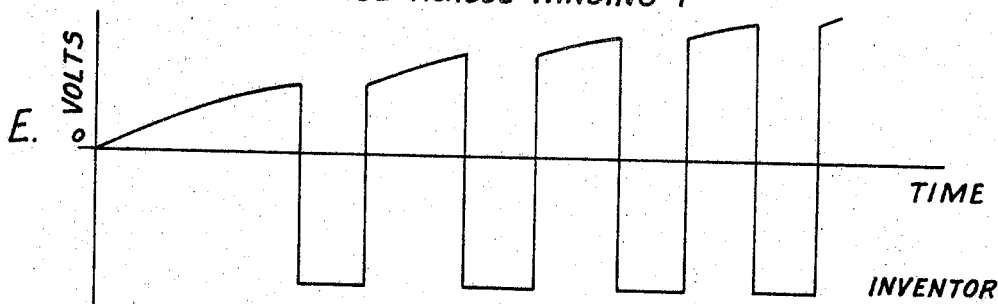

Still regarding the circuit of FIG. 1 without resistor 10 and transistor 11, FIG. 3 provides in five curves, designated A, B, C, D and E, an illustration of the relationship between the various voltages and currents during several operational cycles of this converter, based on holding the DC input voltage at a constant level, and based on a starting capacitor voltage of zero. Based on theoretical considerations the following is true and has been confirmed by oscilloscopic observations. This assumes a transformer ratio of 1:1:1 between windings 5, 6 and 7.

(A) The potential across the transistor 1 shown in curve D is equal to battery potential plus the potential across winding 5, which latter is equal to that across winding 7 as shown in curve E.

(B) During application of voltage to winding 5, the current as shown in curve C rises nearly linearly until peak current is attained, whereupon the current is abruptly switched to zero in the winding 5. The current in winding 7 or the capacitor charging current as shown in curve B thereupon switches from zero to the value which had an instant previous been present on winding 5.

(C) The slope of the capacitor voltage vs. time curve, shown in curve A, in the same as each charging interval begins, and the slope goes to zero as capacitor charging ceases.

(D) The volt-time product of the positive half cycles of voltage on all windings is equal to the volt seconds of negative voltage, as illustrated by curve E and this relationship determines the time of capacitor charging cycles, whereas the time interval for charging energy into the core is dependent on battery potential.

(E) Switchover of the transistor occurs at nearly the same peak current level, regardless of the load applied.

Considered now will be the circuit of FIG. 1 with resistor 10 and transistor 11 included. In turning off transistor 1 without 10 and 11, saturation of transistor 1 was relied on to initiate the shutdown sequence. The level of magnetic energy storage at which this occurs is dependent on the input voltage to the system, on the gain of transistor 1, and on its saturation characteristics, and these are in turn dependent on the operating temperature of the transistor 1. This variability is largely eliminated in the circuit with 10 and 11 included. Resistor 10 develops a voltage proportional to input current. When this potential rises to a value sufficient to cause current to flow through the base-emitter junction of transistor 11, the conduction caused in the emitter-collector junction of transistor 11 diverts current flow from the base of transistor 1, causing, by positive-feedback action, the abrupt turn off of transistor 1, the positive feedback action coming through the relationship of windings 5 and 6 of the transformer 4.

In all other respects operation remains the same as without 10 and 11.

Figure 2:
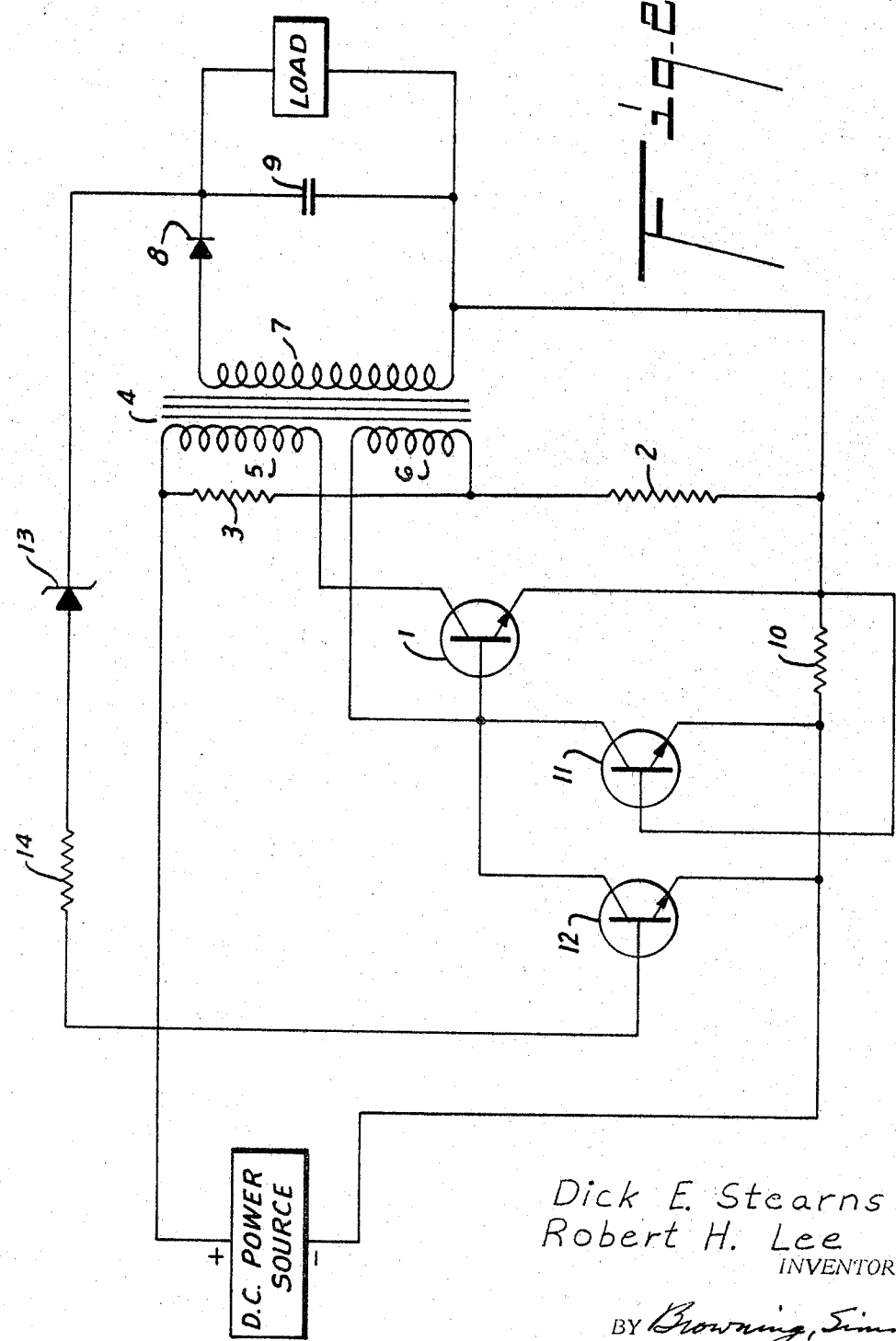
FIG. 2 is a schematic diagram of a circuit as in FIG. 1 but modified to provide also for a cutoff actuated by a predetermined charge on a capacitor charged by the output of the converter.

FIG. 2 illustrates an improved embodiment of the circuit of FIG. 1, which has proven highly practical in use, utilizing a voltage regulator circuit of a type which will shut down the circuit, or limit its "on time" operation, after the output voltage reaches a predetermined level. By selection of component values, it is possible to achieve either a total shutdown of the circuit whenever the preset operating voltage is attained, or a reduction in the energy stored per energy storing half cycle, and consequent continuous operation.

Operation is as described for FIG. 1 except that when the voltage across capacitor 9 is sufficient to cause current flow through Zener diode 13 and resistor 14 and the base-emitter junction of transistor 12, current flow through the collector-emitter junction of transistor 12 bypasses drive current from the base of transistor 1 causing transistor 1 to initiate turnoff action. Thereby output voltage is controlled to the voltage level of the Zener diode 13. The value of resistor 14 in this circuit determines the continuous or other operation as set forth in the preceding paragraph.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

We claim:

1. A DC to DC converter comprising in combination a transformer with a linear magnetizing characteristic having a plurality of windings including a primary power input winding and a feedback winding, means for connecting a DC power source across said power input winding, said last named means including an electronically controlled switch interposed between said power source and said power input winding, a controlling connection between said switch and said feedback winding to maintain said switch open throughout the existence of one polarity of voltage and to maintain said switch closed during the existence of opposite polarity voltage in said feedback winding, overriding control means for said electronic switch including current sensing means in current sensing relationship to said power input winding for sensing current in the power input winding, and a second controlling connection between said sensing means and said switch for terminating the period during which said switch is closed when current in the power input winding attains a predetermined maximum and a half-wave rectifier and capacitance connected in series across one of said windings and providing a load connection across said winding, said rectifier being polarized to pass current only when said switch is in an "off" state.

2. The converter set forth in claim 1 in which the current sensing means includes a resistor in series connection with the power input winding.

3. The converter set forth in claim 1 in which the second controlling connection includes an additional electronic switch connected to the first controlling connection to establish a turn-off potential in said first controlling connection at said first-mentioned switch independently of the potential in said feedback winding when said current in the power input winding exceeds said predetermined maximum.

References Cited

UNITED STATES PATENTS

| 2,967,991 | 1/1961 | Deuitch. | |
| 3,158,751 | 11/1964 | Nelson | 331—112 X |
| 3,316,445 | 4/1967 | Ahrons | 321—2 X |
| 3,331,033 | 7/1967 | Johnston | 321—2 X |
| 2,791,739 | 5/1957 | Light | 321—2 |
| 2,846,580 | 8/1958 | Light | 331—112 |
| 2,957,145 | 10/1960 | Bernstein | 331—112 |

JOHN F. COUCH, Primary Examiner.

W. H. BEHA, JR., Assistant Examiner.

U.S. Cl. X.R.

331—112